United States Patent

[11] 3,622,709

[72] Inventor Garold S. Tjaden
Westmont, Ill.
[21] Appl. No. 847,581
[22] Filed Aug. 5, 1969
[45] Patented Nov. 23, 1971
[73] Assignee Bell Telephone Laboratories, Incorporated
Murray Hill, Berkeley Heights, N.J.

[54] SUPERVISORY CIRCUIT FOR TELEPHONE LINES
10 Claims, 2 Drawing Figs.

[52] U.S. Cl. .......... 179/18 F
[51] Int. Cl. .......... H04m 3/22
[50] Field of Search .......... 179/18 F, 18 FA, 18 FC

[56] References Cited
UNITED STATES PATENTS
2,892,037 6/1959 Feiner .......... 179/18 FC
2,829,203 4/1958 Pitlik .......... 179/18 FA

*Primary Examiner*—Kathleen H. Claffy
*Assistant Examiner*—Randall P. Myers
*Attorneys*—R. J. Guenther and R. B. Ardis

ABSTRACT: A supervisory detection circuit of monitoring the operative state of communication lines in a telephone system in whidh a pair of voltage dividers are cross-connected across the battery feed resistors, the output of the dividers being applied to the inputs of a differential amplifier. The amplifier is adjusted and the divider resistor vaLues selected so that the amplifier output is low when the voltage difference between the two divider outputs is of a particular range of magnitudes and polarity and is high when the voltage difference is of the opposite polarity and of a second range of magnitudes.

INVENTOR
G. S. TJADEN
BY William H. Kaustia
ATTORNEY

SUPERVISORY CIRCUIT FOR TELEPHONE LINES

BACKGROUND OF THE INVENTION

This invention relates to automatic telephone switching systems and more particularly to supervisory circuits for detecting the operative state of communication lines and other circuits in such systems.

As is well known, an automatic telephone system must at all times be alert to service requests in order to perform its primary task of establishing a connection between a calling and a called subscriber. After the receipt of a service request, it must also be capable of receiving directory information in whatever manner manifested in order to set up the connection. When the system is complex as is an electronic switching system, for example, it must additionally observe the electrical state of various points within the central office for administrative, diagnostic, and other purposes.

In a conventional manner, detection of a circuit condition such as the condition of a subscriber line loop is accomplished by noting in the circuit the presence and absence of current. Such current in the case of a subscriber loop is normally supplied by the central office when, during an "off-hook" condition, the subscriber loop is closed. The presence of this current is initially detected as a subscriber request for service. Ideally, the supervisory detection circuitry need only discriminate between the presence of a certain current value and the total absence of current in the circuit being observed. Current other than that supplied by the central office may, however, at times be present in the supervised circuit. Longitudinal alternating currents, for example, induced by currents in conductors lying parallel to those of a subset circuit may be present to affect in varying degrees measurement of direct current at specified points in the subset loop. Leakage currents may also exist from either conductor of the loop to ground or between the two conductors to give an erroneous indication of the line condition to the detection circuitry. As another example, accidental power crosses may affect the ability of the detection circuitry to detect a normal request for service or other valid line closure. Each of these objectionable current conditions may exist in other circuits of the system which require supervision. Accordingly, one requirement imposed on an effective supervisory detection circuit is the ability to sharply discriminate among various current conditions in a supervised circuit in order to distinguish between valid, predetermined currents and spurious currents generated by external sources.

To present a constant and accurate picture of the states of subscriber and other circuits also requires that the supervisory memory circuitry be able to test a circuit with sufficient frequency instantly to detect changes of current state. In some prior art systems, for example, in order to detect a dialing operation, assuming a nominal dialing speed of 20 pulses per second, a frequency of one examination per line every 0.005 second has been found acceptable. A scanning frequency sufficiently high merely to detect direct current interruptions caused by a dialing operation, however, is in many applications not adequate. In present day electronic telephone-switching systems, the status of each subscriber line and trunk is stored in memory where this information is available to control equipment for the accomplishment of switching and call completion operations. The more rapidly line and trunk information is made available for storage in memory the more rapidly a request for service may be processed and the greater will be the call handling capacity of the system. The future promises an even greater demand to improve on this capacity. An advantageous supervisory line and trunk detection circuit must, therefore, have the inherent ability to keep pace with the ever-increasing demands of the newer electronic systems for call handling capacity.

In prior art supervisory circuits it has been necessary to provide some means for isolating the circuit from the speech path of the subscriber loop once the calling information has been received and the connection to the called party established.

This is conventionally accomplished by a cutoff relay operated by the control equipment of the system to prevent a shunt of the speech path by the supervisory circuit. Although prior art systems have coped with the cutoff function, it is clear that a supervisory detection circuit of a character which may remain electrically connected to a subscriber or other line circuit after establishment of a speech path without affecting the characteristics of the path would not only achieve substantial economies in circuit elements but also simplify the control apparatus of the system.

Accordingly, an object of this invention is the elimination of the need for cutting off the supervisory detection circuit monitoring a subscriber or other line after a connection between a calling and a called line has been established in an automatic telephone system.

Another object of this invention is the provision of a new and novel supervisory detection circuit for lines, trunks, and other circuits capable of examining a large number of circuits in a telephone system at a high rate and with a high degree of sensitivity.

A further object of this invention is a supervisory circuit capable of accurately discriminating among a number of current conditions to detect a valid line operative state.

Still another object of this invention is a supervisory detection circuit which is adapted to exploit the high degree of precision offered by the use of thin film fabrication techniques.

SUMMARY OF THE INVENTION

The foregoing and other objects of this invention are realized in one specific embodiment thereof in which a pair of voltage dividers are connected across the ring and tip sides of a subscriber line, for example, the outputs of each being fed to a differential amplifier. A biasing resistor connected between the tap of one divider and ground ensures that the difference in outputs of the dividers is greater than some minimum value and that the polarity of the outputs reverses upon a change in line condition. The outputs of the amplifier are two logic voltage levels indicative of on- and off-hook conditions of the subscriber line. The input impedance to ground of the circuit according to this invention is very large with respect to loop and battery feed resistances with the result that any current flowing through these resistances will be caused by some condition of the line loop and the sensitivity of the circuit is sufficient to reject small voltage changes due to leakage and other currents that may appear in the loop and accept larger changes caused by an off-hook closed loop circuit.

One feature of a detection circuit according to this invention is its high sensitivity which makes possible a substantially decreased difference in on- and off-hook subscriber line conditions. As a result, the total battery feed resistance on each conductor of the loop may be increased to render insertion loss of the detection circuitry in a subscriber line negligible. The necessity of removing the supervisory detection circuit from the line after setting up the speech path is thus eliminated.

BRIEF DESCRIPTION OF THE DRAWING

The foregoing and other objects and features of this invention will be better understood from a consideration of the detailed description of one illustrative embodiment thereof which follows when taken in conjunction with the accompanying drawing in which.

DETAILED DESCRIPTION

Figure 1:
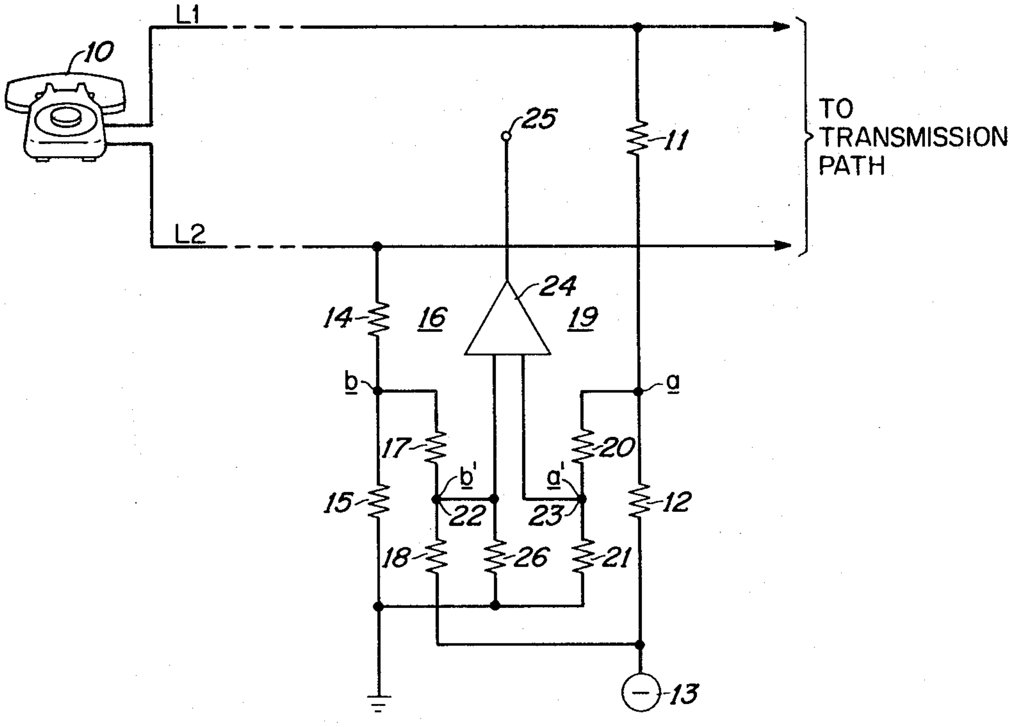
FIG. 1 is a schematic representation of one illustrative supervisory detection circuit according to this invention shown connected in a manner to monitor a subscriber subset loop of a telephone system.

In FIG. 1 one specific illustrative supervisory detection circuit according to this invention is shown connected to a communication line circuit to be monitored in this illustrative case, a subscriber line loop of a telephone system. A subscriber subset 10 is connected by means of conductors L1 and L2 from a remote installation to the central office, at which the supervisory circuit to be described is assumed to be located, and at that point, to a transmission path as directed by the service called for by the subscriber. A pair of battery feed resistors 11 and 12 are connected between conductor L1 and a source of negative potential 13 and a second pair of battery feed resistors 14 and 15 are connected between conductor L2 and ground. The resistors 11 and 14 are substantially equal in value as are the resistors 12 and 15, typical values of which will be considered hereinafter. These values may vary depending upon the particular character of the communication line being monitored.

A voltage divider 16 comprising a pair of resistors 17 and 18 is connected at one end between the resistors 14 and 15 and at the other end to the potential source 13. A second voltage divider 19 comprising a pair of resistors 20 and 21 is connected at one end between the resistors 11 and 12 and at the other end to ground. Taps 22 and 23, respectively, of the dividers 16 and 19 are connected to two inputs of a differential amplifier 24. The latter is shown in block symbol form only and may comprise any suitable circuitry known in the art capable of producing an output in response to two inputs of the character and in the manner to be described. The output of the amplifier 24 is made available at a terminal 25 for use by controller circuitry of the telephone system with which this invention may advantageously be adapted for use. A resistor 26 connects the tap 22 of the divider 16 to ground. The values of the resistors thus far described will be adapted to the particular application of the detection circuit of this invention in a telephone system. In one specific adaptation of the circuit the following values were found suitable:

| | |
|---|---|
| Resistor **11** | 16 K ohms |
| Resistor **12** | 4 K ohms |
| Resistor **14** | 16 K ohms |
| Resistor **15** | 4 K ohms |
| Resistor **17** | 100 K ohms |
| Resistor **18** | 120 K ohms |
| Resistor **20** | 100 K ohms |
| Resistor **21** | 9 K ohms |
| Resistor **26** | 10 K ohms |

Source 13 .......... —48 volts The subset 10 is assumed for purposes of description to include within its network the usual cradle or hook switch and may also have customer actuated contacts for digit pulsing.

With the foregoing organization of one specific supervisory detection circuit according to this invention in mind, an illustrative operation may now be described. The circuit accomplishes its monitoring of the subscriber line by comparing the voltage levels at points *a* and *b* indicated in the drawing. Assuming the resistance values listed in the foregoing, it will be apparent that the input impedance of the dividers is very large with respect to both the line loop resistance and the equivalent battery feed resistance to ground. As a result, essentially any current flowing through the feed resistors 12 and 15 will be due to some condition of the line loop, that is, either the presence of leakage current or an off-hook condition at the subscriber subset. Normally, when the line loop is open and no leakage current exists, the voltage at point *a* is the value of the negative potential source 13 and the voltage at point *b* is substantially zero. Although current paths exist on an on-hook line condition, the relative values of the resistors as indicated render any change from the levels stated for points *a* and *b* negligible.

When the subscriber hook switch is closed and the line circuit completed, the voltage at point *a* rises towards ground and that at point *b* falls from ground due to the current now flowing in the circuit. The latter circuit may be traced from the source 13 through resistors 12 and 11, conductor L1, hook-switch of subset 10, conductor L2, and resistors 14 and 15 to ground. It will be apparent that changes in voltage levels at points *a* and *b* will also occur as the result of current appearing in the loop other than that caused by the closing of the hook-switch, such as, for example, leakage current. It is the function of a circuit according to this invention to reject such small changes in voltage levels not caused by a closure of the line loop and accept as an off-hook state the larger changes in voltage levels caused by a closed loop. A first function of the dividers 16 and 19 is to attenuate the voltage changes occurring at points *a* and *b* (see FIG. 1). In the circuit of FIG. 1, with the values of the resistances given, the voltage changes at the latter points are attenuated by a factor of 12. As a result, a voltage change at point *a* will appear at point *a'* indicated in the drawing as a voltage change one-twelfth as great. A careful matching and selection of the resistors in the two dividers will ensure that a similar attenuation occurs in the divider 16 to reduce the voltage levels at point *b'* by an identical factor. An equal balancing of attenuation factors at the latter points will also serve to reject longitudinal noise.

Figure 2:
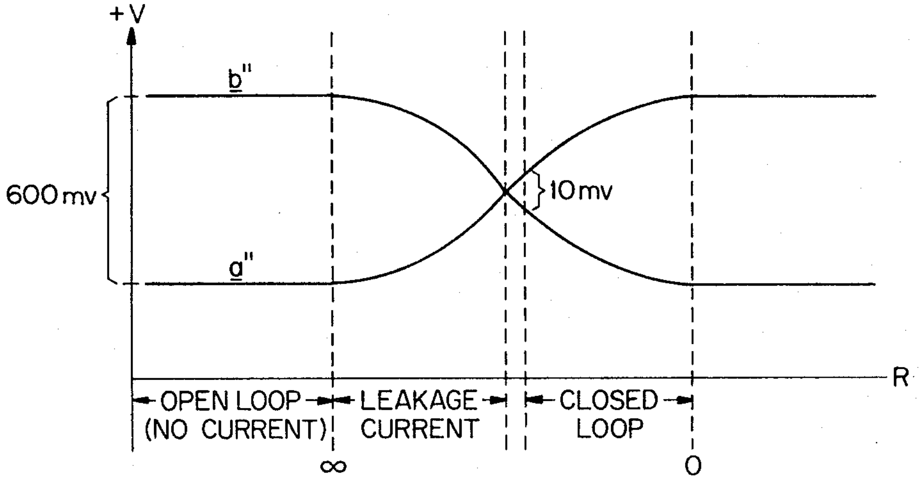
FIG. 2 depicts in graphic from voltage levels at points in the circuit of this invention shown in FIG. 1 during particular operative states.

The voltage dividers 16 and 19 also function to apply a differential bias to the differential amplifier 24 with the result that when the line loop is open and in the absence of leakage current, the voltage at point *b'* is substantially 600 millivolts positive with respect to the voltage at point *a'* —assuming for purposes of description the resistance values given hereinbefore. This voltage differential is indicated in the diagram of FIG. 2 by the levels *b''* and *a''*. The amplifier 24 is so designed that the 600 millivolt bias holds its output in its low, or zero volts state. Upon a closure of the line loop at the hook switch (or upon the presence in the loop of current from whatever source), the voltage level at *b'* falls (as indicated by *b''* in FIG. 2) and the level at *a'* rises (as indicated by *a''* in FIG. 2). The values of the resistances in the exemplary circuit of FIG. 1 have been selected so that upon a closure of the loop, point *a'* rises to a voltage level substantially 10 millivolts more positive than the level of point *b'*. The amplifier 24 is further designed in the illustrative circuit being described with its gain so adjusted that its output will be high when point *a'* is more positive than point *b'* and this difference is at least 10 millivolts. It will be noted from the diagram of FIG. 2 that leakage currents in the line loop cannot cause the amplifier 24 to change state unless they are of sufficient magnitude to reverse the normal voltage levels of points *a'* and *b'*. Resistor 26 operates to ensure that the difference in voltage levels at the points *a'* and *b'* is equal to or greater than a predetermined minimum value and that the relative polarities of these points will be reversed upon a change of state of the subscriber line.

The sensitivity of the specific detection circuit of FIG. 1 in view of the resistance values given in demonstrated from the diagram of FIG. 2 which shows a rejection of a voltage difference between the amplifier 24 inputs of 600 millivolts of one polarity and an acceptance of a voltage swing to the opposite polarity of 610 millivolts input difference. This sensitivity may be varied by merely varying the value of the differential bias. The dividers 16 and 19 further advantageously function to buffer the differential amplifier 24 against lightning surges and inadvertent power crosses on the subscriber line.

Resistors 11 and 14 are inserted in the detection circuit of this invention to increase the impedance to the speech path of the subscriber line with the result that the loss due to the detection circuit is negligible. Although an increase in the magnitude of the battery feed resistance decreases the difference between the worst case on-hook and off-hook loop current conditions, the sensitivity of the supervisory detection circuit of this invention nevertheless makes possible an accurate and reliable discrimination between these two conditions. As a result, the circuit may remain connected to the subscriber line after the establishment of a speech path thus advantageously eliminating the need for providing some means such as cutoff contacts for disconnecting the circuit form the line.

As mentioned in the foregoing, the values of the resistors of the supervisory detection circuit must be selected and adhered to with some degree of precision, the values being determined in view of the particular requirements of the telephone system within which the circuit is advantageously adapted for use. Such precision is readily obtained, and the circuit of this invention most conveniently fabricated, with the use of well-known thin film circuit elements. Such elements also permit a substantial reduction in size and cost as compared with known supervisory detection circuits.

What has been described is considered to be only one specific illustrative embodiment of this invention and numerous other arrangements and modifications as well as applications are readily devised by one skilled in the art without departing from the spirit and scope of this invention as defined by the accompanying claims.

What is claimed is:

1. A supervisory circuit for detecting the condition of a telephone system subscriber line, said line including two line conductors, said supervisory circuit comprising a battery conductor including a battery resistor connected between one of said line conductors and a battery, a ground conductor including a ground resistor connected between the other of said line conductors and ground, a first and a second voltage divider each having an output tap and each having a high impedance with respect to said battery and ground resistors, said first divider being connected between the line conductor side of said battery resistor and ground and said second divider being connected between the line conductor side of said ground resistor and said battery, a biasing resistor connected between the output tap of said second divider and ground for controlling the relative outputs and polarity of said dividers, and amplifying means energized responsive to a difference in output potentials on said taps for generating an output signal indicative of the condition of said line.

2. A supervisory circuit for detecting the operative state of a communication line circuit including two line conductors, said supervisory circuit comprising a first and a second voltage divider each having an output tap and each being connected at one end to one and the other of said line conductors, respectively, in parallel relation across said communication line circuit, the other ends of said voltage dividers, being connected together through a source of potential, a first load resistor connected between the said one end of said first voltage divider and the said other end of said second voltage divider, a second load resistor connected between the said one end of said second voltage divider and the said other end of said first voltage divider, a differential amplifier having a pair of inputs connected respectively to the taps of said dividers, and a biasing resistor connected between one of said taps and one side of said source, said amplifier having one output when the voltage difference between said taps is of one predetermined magnitude and polarity and another output when said difference is of another predetermined magnitude and the opposite polarity.

3. A supervisory circuit for detecting the operative state of a communication line circuit including two line conductors, said supervisory circuit comprising a pair of branches connected at one end to one and the other of said line conductors, respectively, each of said branches serially including a pair of load resistors, a source of potential connected between the other ends of said branches, a first and a second voltage divider each having an output tap and each being connected at one end to one of said branches between the load resistors of a load resistor pair and each being connected at the other end to the opposite branch at opposite sides of said potential source, respectively, a differential amplifier having a pair of inputs connected respectively to the taps of said voltage dividers, and a biasing resistor connected between one of said taps and one side of said source, the sum values of said pairs of load resistors being of a magnitude to offer a high impedance to said line circuit.

4. A supervisory circuit for monitoring a subscriber line loop in a telephone system comprising a first and a second circuit branch each connected at one end to one and the other side of said line loop, respectively, said first branch being cross connected with said second branch by a first voltage divider having an output tap and said second branch being cross connected with said first branch by a second voltage divider also having an output tap, a source of potential connected between the other ends of said first and second circuit branch, a first load resistor serially connected in said first circuit branch between one end of said first voltage divider and one end of said second voltage divider, a second load resistor serially connected in said second circuit branch between the other end of said first voltage divider and the other end of said second voltage divider, a differential amplifier having a pair of inputs connected to said output taps, and a biasing resistor connected between the output tap of said first voltage divider and the one end of said second voltage divider at said first circuit branch.

5. A supervisory circuit for monitoring a subscriber line loop in a telephone system comprising a first and a second circuit path connected to one and the other side of said line loop, respectively, said first and second circuit path each including a first and a second branch connected at one end to a branching point of the circuit path, said first branch of each of said circuit paths including a voltage divider and said second branch of each of said circuit paths including a load resistor, the first branch of each of said circuit paths being connected at its other end to the other end of the second branch of the other of said circuit paths, a differential amplifier having a pair of inputs connected respectively to output taps of said voltage dividers, a biasing resistor connected between an output tap of a voltage divider of one circuit path and the other end of the second branch of the same circuit path, and a source of potential connected between the other ends of said second branches of said circuit paths.

6. A supervisory circuit according to claim 5 in which each of said circuit paths also includes a second load resistor connected between said line loop and said branching point, the sum magnitude of the load resistors in each of said circuit paths presenting a high shunt resistance with respect to the alternating-current impedance of said loop.

7. In a telephone system, in combination, a communication loop having predetermined current conditions, a battery feed circuit comprising a battery conductor connected to one side of said loop including a first feed resistor and terminating in a source of potential and a ground conductor connected to the other side of said loop including a second feed resistor and terminating in ground, a pair of voltage divider circuits connected between said one side of said loop and ground and between said other side of said loop and said source, respectively, and a differential amplifier means having a pair of inputs connected to respective taps of said voltage divider circuits, currents between said source and ground in said first and second voltage divider circuits applying different bias voltages to said inputs to maintain said amplifier means nonconductive in the absence of current in said loop.

8. In a telephone system, the combination as claimed in claim 7 also comprising a biasing resistor connected between one of said taps and said ground for biasing said amplifier means in a conductive state in the presence of current in said loop of a predetermined magnitude.

9. A supervisory circuit for a telephone system comprising a communication loop having predetermined current conditions, a first and a second voltage divider means parallely connected at one end to respective opposite sides of said loop, a differential amplifier having a pair of inputs and an output terminal, said inputs being connected respectively to the taps of said first and second voltage divider means, and means for applying different bias voltages to said inputs for maintaining said amplifier means nonconductive comprising a first circuit including said first voltage divider means and a source of potential connected to said one end of said last-mentioned divider means and a second circuit including said second voltage divider means and said source of potential connected to the other end of said last-mentioned divider means.

10. A supervisory circuit for a telephone system as claimed in claim 9 also comprising a biasing resistor means connected between the tap of said second voltage divider means and the other end of said first voltage divider means for controlling said bias voltage on said inputs responsive to the presence of current of a predetermined magnitude in said loop for causing said amplifier means to generate an output signal on said output terminal.

* * * * *

UNITED STATES PATENT OFFICE
CERTIFICATE OF CORRECTION

Patent No. 3,622,709 Dated November 23, 1971

Inventor(s) Garold S. Tjaden

It is certified that error appears in the above-identified patent and that said Letters Patent are hereby corrected as shown below:

Abstract, line 1, after "circuit" delete "of" and substitute --for--,

Abstract, line 3, after "in" delete "whidh" and substitute --which--,

Abstract, line 6, after "resistor" delete "vaLues" and substitute --values--;

Column 1, line 50, before "circuitry" delete "memory" and substitute --detection--;

Column 2, line 73, after "graphic" delete "from" and substitute --form--;

Column 3, line 4, after "monitored" insert a dash,

Column 3, line 57, align "Source 13........-48 volts" with the foregoing listing;

Column 4, line 62, after "given" delete "in" and substitute --is--;

Column 5, line 9, after "circuit" delete "form" and substitute --from--.

Signed and sealed this 30th day of May 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334

Notice of Adverse Decisions in Interferences

In Interference No. 98,021 involving Patent No. 3,622,709, G. S. Tjaden, SUPERVISORY CIRCUIT FOR TELEPHONE LINES, final judgment adverse to the patentee was rendered Dec. 22, 1972, as to claim 7.

[*Official Gazette March 6, 1973.*]